(12) United States Patent
Kelley et al.

(10) Patent No.: US 11,816,222 B2
(45) Date of Patent: *Nov. 14, 2023

(54) DETECTING VULNERABILITIES IN MANAGED CLIENT DEVICES

(71) Applicant: AirWatch LLC, Atlanta, GA (US)

(72) Inventors: Scott Harlow Kelley, Atlanta, GA (US); Adarsh Subhash Chandra Jain, Atlanta, GA (US); Stephen Turner, Atlanta, GA (US)

(73) Assignee: AirWatch, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,581

(22) Filed: Aug. 1, 2022

(65) Prior Publication Data

US 2022/0366057 A1 Nov. 17, 2022

Related U.S. Application Data

(63) Continuation of application No. 16/600,986, filed on Oct. 14, 2019, now Pat. No. 11,423,156, which is a continuation of application No. 15/084,542, filed on Mar. 30, 2016, now Pat. No. 10,445,506.

(51) Int. Cl.
| | |
|---|---|
| *G06F 21/57* | (2013.01) |
| *G06F 21/56* | (2013.01) |
| *H04W 12/06* | (2021.01) |
| *H04W 12/37* | (2021.01) |

(52) U.S. Cl.
CPC ............ *G06F 21/577* (2013.01); *G06F 21/56* (2013.01); *G06F 2221/034* (2013.01); *H04W 12/06* (2013.01); *H04W 12/37* (2021.01)

(58) Field of Classification Search
None
See application file for complete search history.

(56) References Cited

U.S. PATENT DOCUMENTS

| | | | |
|---|---|---|---|
| 6,035,423 | A | 3/2000 | Hodges et al. |
| 9,077,745 | B1 | 7/2015 | Kline |
| 2005/0050335 | A1 | 3/2005 | Liang et al. |
| 2005/0216759 | A1 | 9/2005 | Rothman et al. |

(Continued)

FOREIGN PATENT DOCUMENTS

| | | |
|---|---|---|
| CN | 104821950 | 8/2015 |

OTHER PUBLICATIONS

Max Landman, Managing Smart Phone Security Risks, ACM 2010, 11 pages (Year: 2010).

(Continued)

*Primary Examiner* — Bassam A Noaman
(74) *Attorney, Agent, or Firm* — Thomas | Horstemeyer, LLP

(57) ABSTRACT

The disclosure relates to detecting vulnerabilities in managed client devices. A system determines whether a vulnerability scan of a computing device is required to be performed. The system installs a vulnerability detection component in the computing device in response to determining that the vulnerability scan is required to be performed. The system requests the vulnerability detection component to perform the vulnerability scan of the computing device. The system transmits a result of the vulnerability scan to a remote management service for the computing device.

18 Claims, 7 Drawing Sheets

(56) References Cited

U.S. PATENT DOCUMENTS

| | | |
|---|---|---|
| 2006/0075140 A1 | 4/2006 | Sobel et al. |
| 2006/0161965 A1 | 7/2006 | Shelest et al. |
| 2008/0263677 A1 | 10/2008 | Kaditz et al. |
| 2009/0064335 A1 | 3/2009 | Sinn et al. |
| 2010/0100962 A1* | 4/2010 | Boren ............... H04L 63/1441 726/25 |
| 2013/0013905 A1 | 1/2013 | Held et al. |
| 2013/0297759 A1 | 11/2013 | Staats et al. |
| 2014/0281493 A1 | 9/2014 | Nakhjiri |
| 2015/0058456 A1 | 2/2015 | Staats et al. |
| 2015/0150072 A1 | 5/2015 | Doctor et al. |
| 2015/0304110 A1 | 10/2015 | Oberheide et al. |
| 2015/0319252 A1 | 11/2015 | Momchilov et al. |
| 2016/0088026 A1 | 3/2016 | Mohamad Abdul et al. |
| 2016/0100301 A1 | 4/2016 | Gaurav et al. |
| 2016/0164880 A1 | 6/2016 | Colesa et al. |
| 2016/0179624 A1 | 6/2016 | Stuntebeck et al. |
| 2017/0006060 A1 | 1/2017 | Venkataramani et al. |
| 2017/0094509 A1 | 3/2017 | Mistry et al. |
| 2018/0067676 A1* | 3/2018 | Shi ....................... G06F 3/0631 |

OTHER PUBLICATIONS

Meng; et al., Surveying the Development of Biometric User Authentication on Mobile Phones, IEEE 2014, 26 pages (Year: 2014).

Puzis; et al., A Decision Support System for Placement of Intrusion Detection and Prevention Devices in Large-Scale Networks, ACM 2011, 26 pages (Year: 2011).

Robert Newman, Cybercrime, Identity Theft, and Fraud: Practicing Safe Internet—Network Security Threats and Vulnerabilities, ACM 2006, 11 pages (Year: 2006).

Su et al., A Preliminary Investigation of Worm Infections in a Bluetooth Environment, ACM 2006, 8 pages (Year: 2006).

Zhang et al., Defending Connected Vehicles Against Malware: Challenges and a Solution Framework, IEEE 2014, 12 pages (Year 2014).

* cited by examiner

DETECTING VULNERABILITIES IN MANAGED CLIENT DEVICES

CROSS-REFERENCE TO RELATED APPLICATIONS

This application is a continuation of and claims the benefit of U.S. patent application Ser. No. 16/600,986, "DETECTING VULNERABILITIES IN MANAGED CLIENT DEVICES," and filed Oct. 14, 2019, which is a continuation of U.S. Pat. No. 10,445,506, entitled "DETECTING VULNERABILITIES IN MANAGED CLIENT DEVICES," and issued Oct. 15, 2019, which are hereby incorporated by reference in their entireties.

BACKGROUND

Employees and contractors of enterprises often use computing devices to access enterprise resources, such as enterprise email and data. Because enterprise resources may include confidential information, enterprises typically enact measures to prevent unauthorized access to their resources. However, vulnerabilities in user devices may increase the risk of unauthorized access to enterprise resources.

Malicious software, or "malware," is one type of vulnerability that can facilitate unauthorized access to enterprise resources. Malicious software can include programs that are intended to perform malicious activity, such as deleting data or defeating security measures.

Other types of vulnerabilities include defects, or "bugs," in software components of computing devices. Although these types of defects may not be malicious by themselves, malicious users can exploit defects in order to perform malicious acts. For example, the Stagefright bug is a known defect in a software library for the ANDROID operating system. The Stagefright bug is a defect in the ANDROID operating system's Stagefright software library used to render various types of multimedia files. Malicious users can potentially exploit the Stagefright defect in order to execute malicious code through videos included in multimedia messaging service (MMS) messages. In particular, a malicious user can exploit the Stagefright defect as a backdoor to perform malicious functionality through unauthorized remote code execution and privilege escalation.

Enterprise Mobility Management (EMM) vendors can manage mobile devices, networks, and enterprise computing systems for enterprises. As part of their management duties, EMM vendors can be responsible for identifying devices that potentially include vulnerabilities. As such, there currently exists a need to identify devices that potentially include vulnerabilities.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to the detection of vulnerabilities in client devices that can be managed by an enterprise management service. In one example, the management service can require the client device to install a management component during an enrollment process with the management service. Upon installation, the management component can obtain and install a vulnerability detection component, which can be a third-party component, in the client device. In addition, the management component can request the vulnerability detection component to scan the client device 106 for vulnerabilities, such as viruses and software defects. Once the vulnerability scan is complete, the vulnerability detection component can provide the management component with results of the scan, including a vulnerability severity metric that can specify the severity of vulnerabilities detected in the client device.

The management component can then transmit the results of the vulnerability scan to the management service. Based on the results of the vulnerability scan, the management service can determine whether to perform various actions. For example, if the vulnerability severity metric indicates that there are no detected vulnerabilities in the client device 106, the management service can permit the client device to exit a quarantine state and complete the enrollment process with the management service. If the vulnerability severity metric indicates that there is a severe vulnerability detected in the client device, the management service can perform a remedial action, such as removing enterprise email access from the client device.

In the following discussion, examples of systems and their components are described, followed by examples of the operation of those systems.

Figure 1:
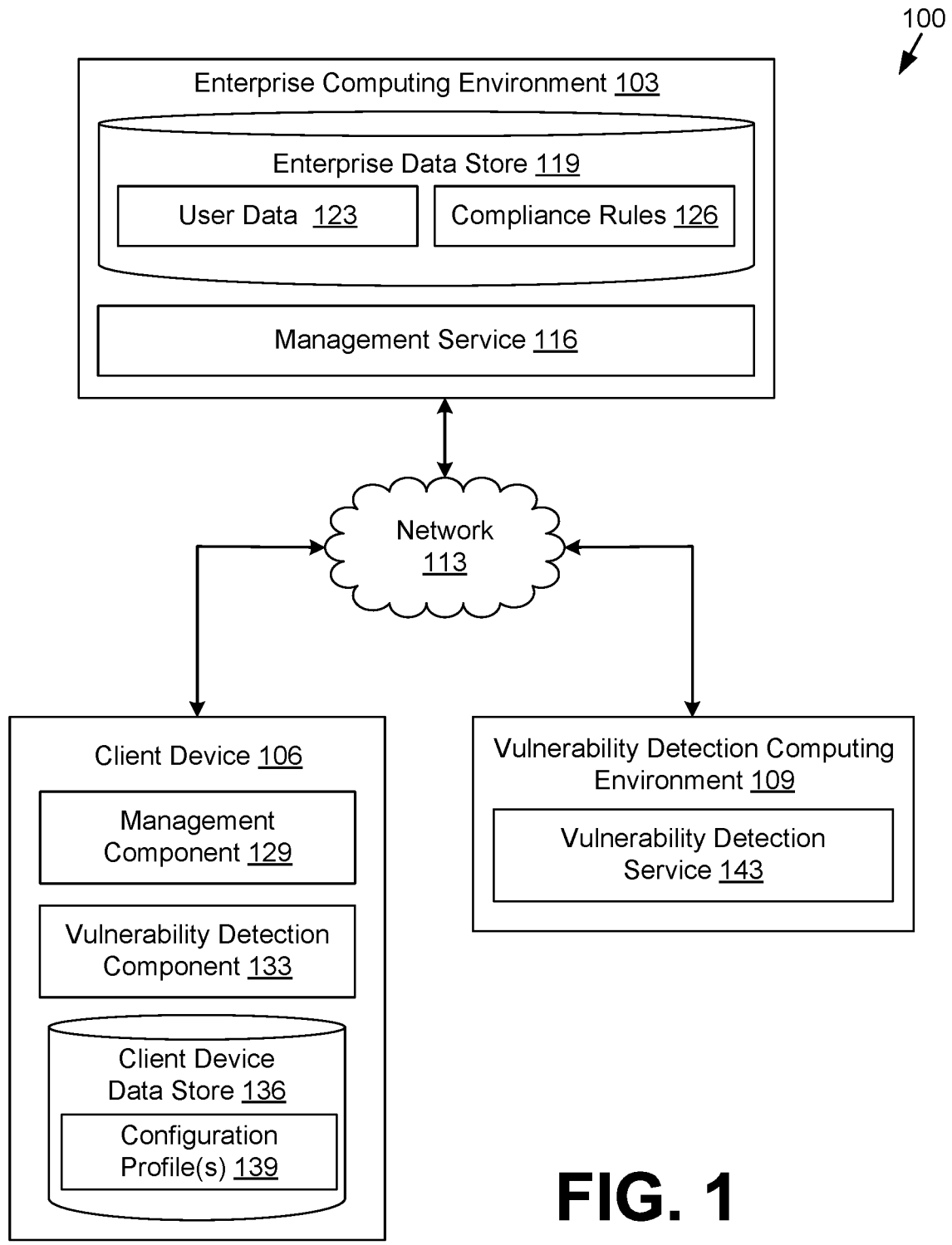
FIG. 1 is a drawing of an example of a networked environment.

With reference to FIG. 1, shown is an example of a networked environment 100. The networked environment 100 can include an enterprise computing environment 103, a client device 106, and a vulnerability detection computing environment 109 in data communication through a network 113. The network 113 can include the Internet, one or more intranets, extranets, wide area networks (WANs), local area networks (LANs), wired networks, wireless networks, or any combination of two or more such networks. The network 113 can include satellite networks, cable networks, Ethernet networks, cellular networks, and telephony networks.

The enterprise computing environment 103 can be a computing system operated by one or more enterprises, such as a business or other organization. The enterprise computing environment 103 can include a computing device, such as a server computer, that can provide computing capabilities. Alternatively, the enterprise computing environment 103 can include multiple computing devices arranged in one or more server banks or computer banks. For examples in which the enterprise computing environment 103 includes multiple computing devices, the computing devices can be located in a single installation, or the computing devices can be distributed among multiple different geographical locations.

In some examples, the enterprise computing environment 103 can include computing devices that together form a hosted computing resource or a grid computing resource. In other examples, the enterprise computing environment 103 can operate as an elastic computing resource for which the allotted capacity of computing-related resources, such as processing resources, network resources, and storage resources, can vary over time. In other examples, the enterprise computing environment 103 can include or be operated as one or more virtualized computer instances that can be executed in order to perform the functionality that is described herein.

The enterprise computing environment 103 can include various systems. For example, the enterprise computing environment 103 can include a management service 116 that can monitor and manage the operation of client devices 106 associated with the enterprise that operates the enterprise computing environment 103. In some examples, the management service 116 can manage and oversee the operation of multiple client devices 106 enrolled in a mobile device management service that is provided by the management service 116. The management service 116 can also provide the client devices 106 with access to email, calendar data, contact information, and other resources associated with the enterprise.

The enterprise computing environment 103 can also include an enterprise data store 119. The enterprise data store 119 can be representative of multiple enterprise data stores 119 accessible by components in the networked environment 100. The enterprise data store 119 can store various data associated with the enterprise computing environment 103. For example, the enterprise data store 119 can store user data 123 and compliance rules 126.

The user data 123 stored in the enterprise data store 119 can include data that represents information corresponding to users that are associated with the enterprise computing environment 103. For example, the user data 123 can specify which particular resources, such as data and applications, that a particular user is entitled to access. The user data 123 in some examples can specify the role of a user in the enterprise, such as the job title or business groups to which the user is a member.

The management service 116 can assign various compliance rules 126 to respective client devices 106. The compliance rules 126 can specify, for example, one or more conditions that must be satisfied for the client device 106 to be deemed compliant with the compliance rule 126. In various examples, the enterprise computing environment 103, the client device 106, or both the enterprise computing environment 103 and the client device 106 can determine whether the client device 106 satisfies a compliance rule 126. For example, the client device 106 can generate a data object that describes the state of the client device 106 along with associated information, settings, and parameters. Components in the client device 106 or the management service 116 can evaluate the data object to determine whether the client device 106 is compliant with corresponding compliance rules 126.

In one example, a compliance rule 126 can specify that particular applications must be or are prohibited from being installed in the client device 106. As another example, a compliance rule 126 can specify that the client device 106 must be located in a secured location, such as the premises of the enterprise that operates the enterprise computing environment 103, in order for the client device 106 to be authorized to access or render content in the client device 106. In another example, a compliance rule 126 can specify that a lock screen is required to be generated when the client device 106 is "awoken" from a low power "sleep" state and that a passcode is required for a user to unlock the lock screen.

Various compliance rules 126 can be based on time, geographical location, or device and network properties. For instance, the client device 106 can satisfy a compliance rule 126 when the client device 106 is located within a particular geographic location. The client device 106 can satisfy a compliance rule 126 in other examples when the client device 106 is in communication with a particular local area network, such as a particular local area network that is managed by the enterprise computing environment 103. Furthermore, a compliance rule 126 in another example can be satisfied upon the time and date matching specified values.

Another example of a compliance rule 126 involves whether a user belongs to a particular user group. For instance, a compliance rule 126 can include a whitelist or a blacklist that specifies whether particular users or groups of users are authorized to perform various functionality, such as installing or executing a particular application.

Furthermore, some compliance rules 126 can relate to whether a vulnerability is detected in the client device 106. For example, a compliance rule 126 can specify that the client device 106 is permitted to exit a quarantine state during registration with the management service 116 only if a particular type of vulnerability has not been detected in the client device 106. Another compliance rule 126 can specify that particular functionality provided by the enterprise computing environment 103 or client device 106 is to be made inaccessible to the client device 106 if a vulnerability is detected. For instance, the management service 116 can disable email access for the client device 106 in response to detection of a vulnerability.

In some examples, an enterprise can operate the management service 116 to ensure that the client devices 106 of its users satisfy respective compliance rules 126. By ensuring that the client devices 106 of its users are operating in compliance with the compliance rules 126, the enterprise can control access to resources and thereby improve the security of devices associated with the enterprise and the users of the client devices 106.

The client device 106 can be representative of multiple client devices 106 that can be coupled to the network 113. The client device 106 can include a processor-based computer system, such as a desktop computer, a laptop computer, a personal digital assistant, a mobile phone, or a tablet computer.

The client device 106 can include a management component 129 and a vulnerability detection component 133. The management component 129 can monitor activity and settings in the client device 106. The management component 129 can also configure settings in the client device 106. In addition, the management component 129 can determine whether the client device 106 satisfies with the compliance rules 126 assigned to the client device 106. In some examples, the management component 129 can parse a data object that describes the state of and settings in the client device 106 to determine whether the client device 106 is compliant. In other examples, the management component 129 can communicate with the management service 116 to determine whether the management service 116 deems the client device 106 compliant with compliance rules 126.

In some examples, the management component 129 can be a portion of the operating system for the client device 106. In another example, the management component 129 can operate in the application layer of the client device 106.

For instance, the management component 129 can be a dedicated application that can monitor and manage data, software components, and hardware components associated with the client device 106.

In other examples, at least a portion of the management component 129 can be a portion of an application that provides functionality in addition to monitoring and managing resources in the client device 106. To this end, the enterprise computing environment 103 can provide a software development kit (SDK) that a developer of an application can use to insert security libraries and other components of the management component 129 into the application. In another approach, the management service 116 or the developer of the application can incorporate libraries and other components of the management component 129 into an application through a process known as "wrapping." To wrap an application, the developer or management service 116 can decompile the application and then insert the libraries into the decompiled application. The developer or management service 116 can then recompile the application with the added security libraries for the management component 129.

When a library for the management component 129 is incorporated into an application, the functionality provided by the library can be invoked by the management component 129 when executed in the client device 106. For example, if a security library provides the ability to monitor and enable or disable functionality provided by an application, the management component 129 can call functions provided by the library to monitor and enable or disable the functionality.

The vulnerability detection component 133 can perform scans of hardware and software of the client device 106 to determine whether a vulnerability is present in the client device 106. Examples of vulnerabilities that the vulnerability detection component 133 can detect include the presence of a malicious software, the presence of software or hardware components known to be susceptible to malicious exploit, and the presence of a component that lacks a software patch that remedies a flaw with the component.

In some examples, the vulnerability detection component 133 can be developed, maintained, or distributed by an entity that is a third party relative to the enterprise that provides the enterprise computing environment 103 and the user of the client device. The management component 129 can provide an interface, such as an application programming interface (API) that can facilitate communication between the management component 129 and the vulnerability detection component 133.

Using the interface provided by the management component 129, the vulnerability detection component 133 can provide the management component 129 with results from its vulnerability scan. For example, the vulnerability detection component 133 can provide information that describes the results of the scan, such as the identity of any detected vulnerabilities. In addition, the scan results can include a vulnerability severity metric. The vulnerability severity metric can be a score that indicates to the management component 129 and management service 116 a level of severity of detected vulnerabilities in the client device 106.

For example, a relatively low vulnerability severity metric can indicate that the detected vulnerability is not likely to defeat security measures or to expose the client device 106 or management service 116 to unauthorized access or malicious activity. By contrast, a relatively high vulnerability severity metric can indicate that the detect vulnerability is critical and is likely to expose the client device 106 or management service 116 to an increased risk of unauthorized access or malicious activity. For examples in which the vulnerability detection component 133 detects multiple vulnerabilities, the vulnerability detection component 133 can generate an aggregate vulnerability severity metric that indicates the combined level of severity of the multiple detected vulnerabilities. The enterprise that operates the management service 116 can provide guidelines to the entity that develops the vulnerability detection component 133 for defining what the different vulnerability severity metrics represent. Alternatively, the vulnerability severity metric can be determined by the management component 129 or the management service 116 based on the results of the scan.

The client device 106 can also include a client device data store 136. The client device data store 136 can be representative of multiple client device data stores 136 that can be accessible to the client device 106. The client device data store 136 can store data associated with the client device 106. For example, the client device data store 136 can store configuration profiles 139 for the client device 106 and the management component 129.

A configuration profile 139 can be a data object that includes configuration information for the client device 106 or the management component 129. In some examples, a configuration profile 139 can include an extensible markup language (XML) or JAVASCRIPT object notation (JSON) data object that specifies configuration information. A configuration profile 139 can specify settings for the client device 106, such device restrictions, network interface settings, virtual private network (VPN) settings, and email account settings. A configuration profile 139 can also provide credentials and keys, such as certificates that the management component 129 can use to authenticate components in the client device 106.

The vulnerability detection computing environment 109 can be a computing system operated by one or more enterprises, such as a business or other organization. The vulnerability detection computing environment 109 can include a computing device, such as a server computer, that can provide computing capabilities. Alternatively, the vulnerability detection computing environment 109 can include multiple computing devices arranged in one or more server banks or computer banks. For examples in which the vulnerability detection computing environment 109 includes multiple computing devices, the computing devices can be located in a single installation, or the computing devices can be distributed among multiple different geographical locations.

In some examples, the vulnerability detection computing environment 109 can include computing devices that together form a hosted computing resource or a grid computing resource. In other examples, the vulnerability detection computing environment 109 can operate as an elastic computing resource for which the allotted capacity of computing-related resources, such as processing resources, network resources, and storage resources, can vary over time. In other examples, the vulnerability detection computing environment 109 can include or be operated as one or more virtualized computer instances that can be executed in order to perform the functionality that is described herein.

The vulnerability detection computing environment 109 can be operated by the entity that develops, maintains, or distributes the vulnerability detection component 133. As described above, the entity that develops, maintains, or distributes the vulnerability detection component 133 can be a third party relative to the enterprise operating the management service 116 and the user of the client device 106.

The vulnerability detection computing environment 109 can include various systems. For example, the vulnerability detection computing environment 109 can include a vulnerability detection service 143. The vulnerability detection service 143 can analyze various data provided by the vulnerability detection component 133 or the management service 116. For instance, in some examples, the vulnerability detection component 133 can collect information regarding components associated with the client device 106 and transmit the collected information to the vulnerability detection service 143 to determine whether a vulnerability is present. In other examples, the vulnerability detection component 133 can process the data locally to determine whether a vulnerability is present. As will be described in further detail below, the management service 116 can also provide collected data to the vulnerability detection service 143 for vulnerability analysis. The vulnerability detection computing environment 109 can also be part of the enterprise computing environment 103.

Next, examples of the operation of the networked environment 100 are described. To begin, the user of the client device 106 can initiate the process of enrolling the client device 106 with the management service 116. To this end, the user of the client device 106 can install the management component 129. In some examples, the client device 106 can retrieve an installation package for the management component 129 from an application repository, such as a public application repository or a private application repository provided by the management service 116, and then execute the installation package in the client device 106.

Once the management component 129 is installed in the client device 106, the management component 129 can communicate with the management service 116 to authenticate the user and verify that the client device 106 is authorized to enroll with the management service 116.

The management service 116 can then create a device record for the client device 106 in the user data 123. In addition, the management service 116 can associate the client device 106 with a quarantine state. While in the quarantine state, the management service 116 can provide the client device 106 with access to only a limited subset of the services provided by the management service 116. For example, the management service 116 can prevent or limit the client device 106 from accessing at least some of the enterprise resources, such as enterprise email access and access to enterprise data in the enterprise data store 119. In addition, the management service 116 can notify the management component 129 that the client device 106 is in the quarantine state.

The management component 129 can also transmit a configuration profile 139 to the management component 129 for installation. As described above, the configuration profile 139 can specify configuration information for the client device 106 or the management component 129. For example, the configuration profile 139 can specify settings for the client device 106, such as device restrictions and configuration parameters.

Once the management component 129 obtains the configuration profile 139, the management component 129 can install the configuration profile 139 in a profile bank of the client device 106 to define device settings for the client device 106. In this way, the management component 129 can implement restrictions in the client device 106.

The configuration profile 139 can also specify that the management component 129 is to request the vulnerability detection component 133 to perform a vulnerability scan. Thus, the management component 129 can determine whether the vulnerability detection component 133 is already installed in the client device 106 by, for example, consulting a list of applications installed in the client device 106. If the vulnerability detection component 133 is not already installed in the client device 106, the management component 129 can retrieve an installation package for the vulnerability detection component 133 from a location specified by the configuration profile 139. For example, the configuration profile 139 can indicate that an installation package for the vulnerability detection component 133 is available through a particular public or private application repository. Once the client device 106 obtains the installation package, the client device 106 can execute the installation package to install the vulnerability detection component 133 in the client device 106.

Once the vulnerability detection component 133 is installed in the client device 106, or if the vulnerability detection component 133 was already installed, the management component 129 can request the vulnerability detection component 133 to perform a vulnerability scan of the client device 106. In examples in which the vulnerability detection component 133 can scan for further multiple types of vulnerabilities, the vulnerability detection component 133 can specify the types of vulnerabilities for which the vulnerability detection component 133 should scan. To make the request, the management component 129 can provide an API call to the vulnerability detection component 133.

In response to the request, the vulnerability detection component 133 can scan for malware and exploitable hardware or software defects, and the vulnerability detection component 133 can generate results of the scan. In some examples, the vulnerability detection component 133 can scan the client device 106 and perform detection analysis locally in the client device 106. In other examples, the vulnerability detection component 133 can collect information from the client device 106 and transmit the collected information to the vulnerability detection service 143. Upon receiving the collected information, the vulnerability detection service 143 can perform detection analysis in the vulnerability detection computing environment 109. The vulnerability detection service 143 can then provide the results of the scan to the vulnerability detection component 133, the management component 129, or the management service 116.

The results generated by the vulnerability detection component 133 or the vulnerability detection service 143 can specify whether the vulnerability detection component 133 detected any vulnerabilities, a description of detected vulnerabilities, and a vulnerability severity metric indicating a level of severity of any detected vulnerabilities. In addition, the vulnerability detection component 133 can generate data representing the state of the client device 106, such as settings and configurations in the client device 106.

The vulnerability detection component 133 can provide the results of a vulnerability scan to the management component 129. When receiving results from the vulnerability detection component 133, the management component 129 can authenticate the vulnerability detection component 133 using, for example, a public key assigned to the developer of the vulnerability detection component 133 that the management service 116 includes in a configuration profile 139. In this way, the management component 129 can detect whether another component is posing as the vulnerability detection component 133 and providing fraudulent vulnerability scan results to the management component 129.

Once the management component 129 obtains the vulnerability scan results, the management component 129 can process the results and determine whether the management component 129 should perform a responsive action. For example, if the vulnerability severity metric included in the results exceeds a particular threshold, the management component 129 can perform a remedial action specified by a compliance rule 126.

In addition, the management component 129 can transmit the results of the vulnerability scan to the management service 116. In other examples, the management service 116 can obtain the scan results from the vulnerability detection service 143. Once the management service 116 obtains the vulnerability scan results, the management service 116 can process the results and determine whether the management service 116 should perform a responsive action.

In some examples, the management service 116 can perform an action based on the vulnerability severity metric included in the scan results. In particular, the compliance rules 126 can specify the particular actions that the management service 116 is to initiate based on the vulnerability severity metric. For instance, if the vulnerability severity metric exceeds a particular value, a compliance rule 126 can specify that the management service 116 is to associate the device record for the client device 106 with a permanent flag indicating that the client device 106 is compromised. In this situation, the management service 116 can later delete the device record and create a new device record for the client device 106 if the detected vulnerability is believed to be remedied.

Another compliance rule 126 can specify that if scan results have a vulnerability severity metric that is below a particular value, the management service 116 can initiate other types of actions that are less severe. For example, the management service 116 can transmit instructions to the client device 106 that instruct the user or the management component 129 how to fix the vulnerability. A compliance rule 126 can also specify which services provided by the management service 116 are to be made accessible and inaccessible to the client device 106 in response to a vulnerability scan result including a vulnerability severity metric of various values.

In addition, if the scan results include a vulnerability severity metric that is below a particular value, the management service 116 can cause the client device 106 to exit the quarantine state. In this regard, the management service 116 can modify the device record for the client device 106 to indicate that the client device 106 has exited the quarantine state. The management service 116 can also provide full access to the services that the user data 123 indicates the client device 106 is entitled.

If the management service 116 determines to cause the client device 106 to exit the quarantine state, the management service 116 can transmit an instruction for the management component 129 to uninstall the vulnerability detection component 133. In response to receiving the instruction, the management component 129 can provide an API call to the operating system of the client device 106 to cause the installation of the vulnerability detection component 133.

In other examples, the management service 116 can request the management component 129 to initiate a vulnerability scan from time to time. For example, in response to a triggering event, the management service 116 can transmit a request for the management component 129 to initiate a vulnerability scan and return scan results to the management service 116, using one or more of the techniques described above. In this way, the management service 116 can periodically determine whether the client device 106 includes detected vulnerabilities.

The management service 116 can also provide the results of the vulnerability scan to the vulnerability detection service 143 or the management service 116. For example, if the results of a vulnerability scan are inconclusive as to whether a vulnerability is present in the client device 106, the management service 116 can transmit the results to the vulnerability detection service 143 for further vulnerability detection analysis, or the management service 116 can perform further analysis itself. The vulnerability detection service 143 can then perform additional vulnerability detection analysis and provide the management service 116 a report of the results.

Figure 2A:
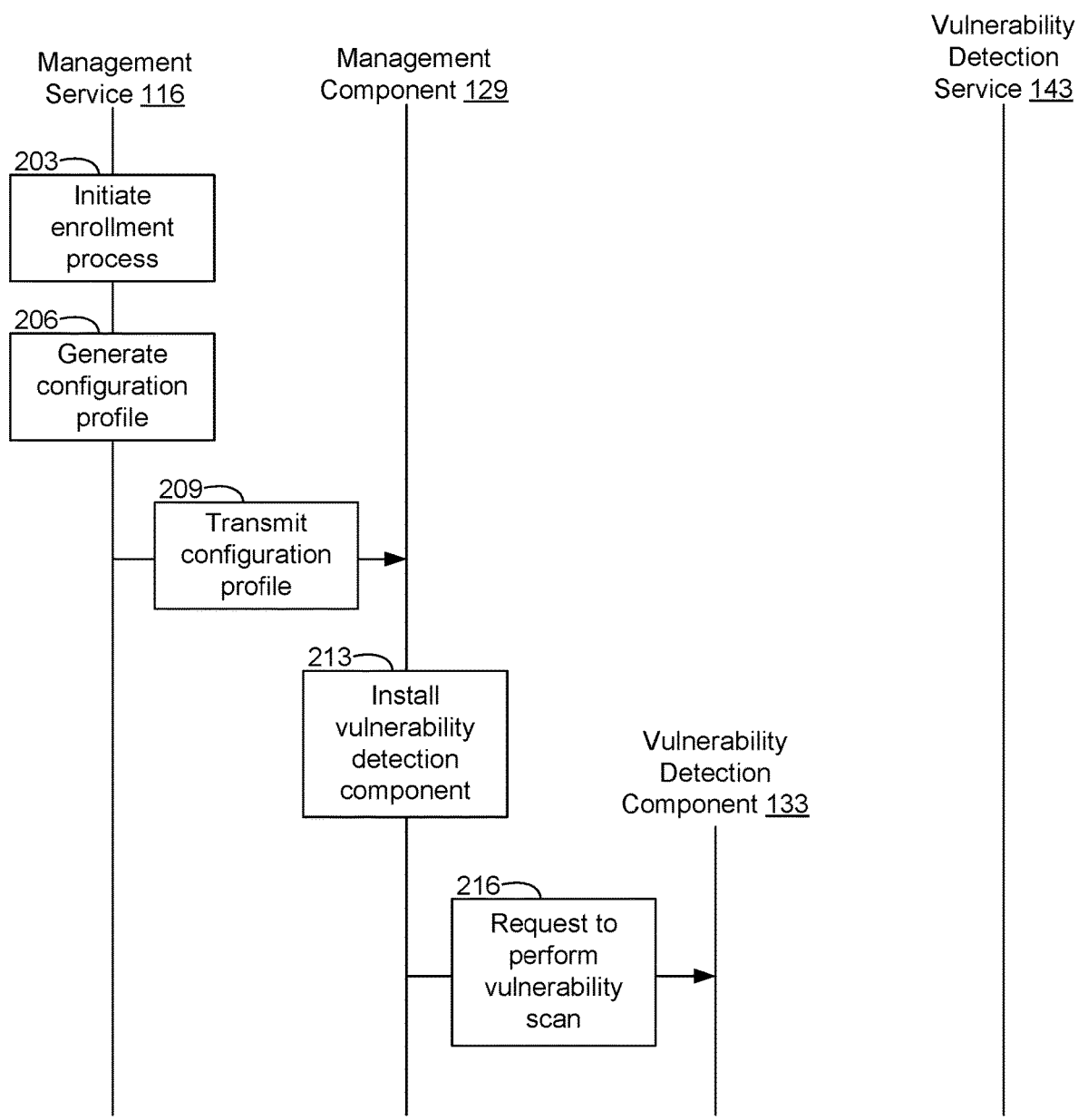
FIGS. 2A-2B show a sequence diagram illustrating an example of component interaction.
Figure 2B:
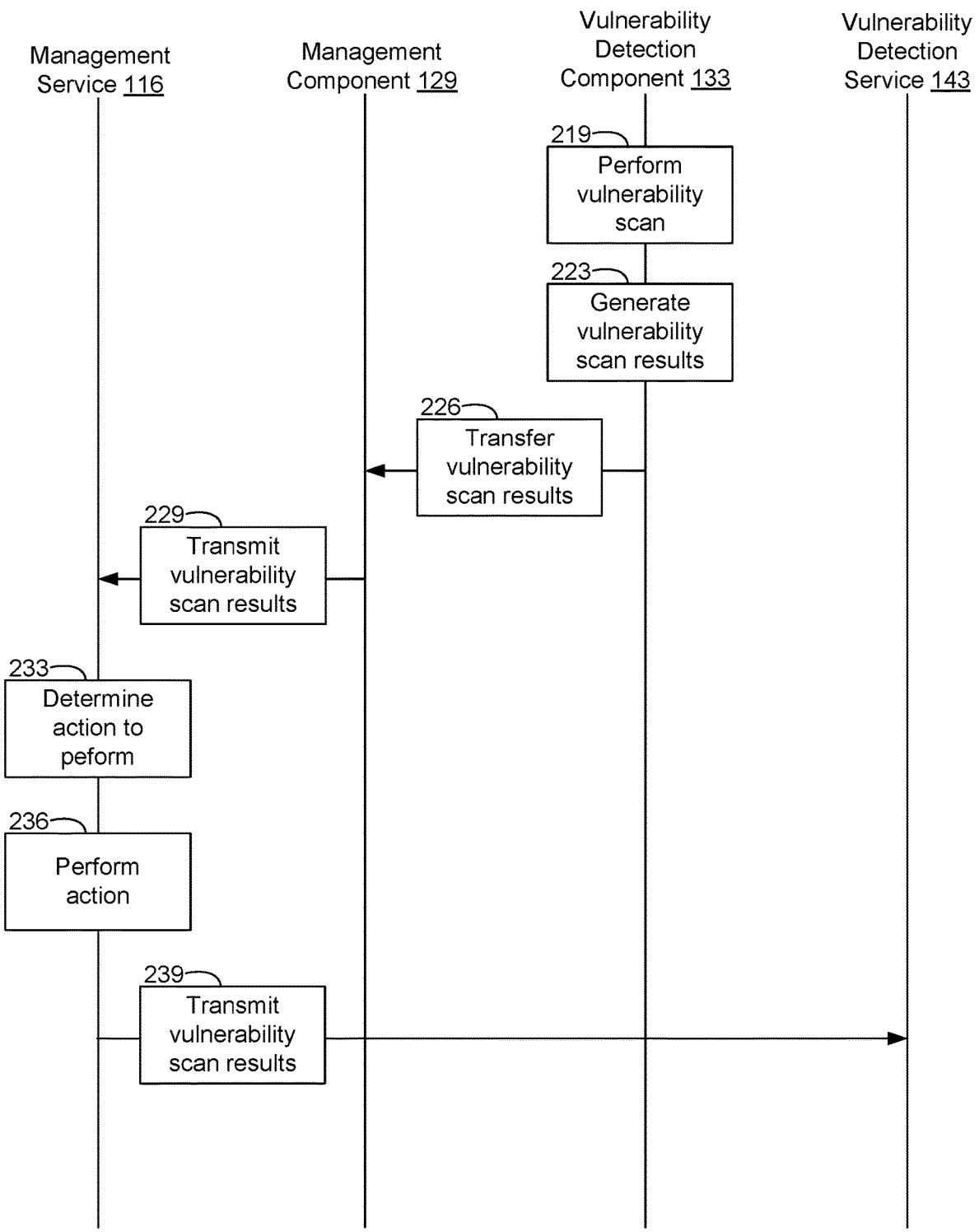

With reference to FIGS. 2A-2B, shown are sequence diagrams illustrating an example of interactions of components in the networked environment 100. The sequence diagram of FIGS. 2A-2B illustrates an example of the management component 129 instructing the vulnerability detection component 133 to perform a vulnerability scan and obtaining scan results from the vulnerability detection component 133.

Beginning with step 203, the management component 129 can initiate the process of enrolling the client device 106 with the management service 116. As previously discussed, the enterprise that operates the enterprise computing environment 103 can require individuals, such as employees and contractors, associated with the enterprise to enroll their client devices 106 with the management service 116 to reduce the risk of being subject to malicious computer activity unauthorized access to enterprise resources.

At step 206, the management service 116 can generate a configuration profile 139. The configuration profile 139 can specify settings and restrictions in the client device 106. In addition, the configuration profile 139 can specify that the management component 129 is to install the vulnerability detection component 133 and request the vulnerability detection component 133 to perform a vulnerability scan of the client device 106. The configuration profile 139 can also include the public key for the developer of the vulnerability detection component 133 that the management component 129 can use to authenticate communications from the vulnerability detection component 133. As shown at step 209, the management service 116 can transmit the generated configuration profile 139 to the management component 129.

As described above, the configuration profile 139 can specify that the management component 129 is to install the vulnerability detection component 133 and request the vulnerability detection component 133 to perform a vulnerability scan. Thus, as shown at step 213, the management component 29 can install the vulnerability detection component 133. To this end, the management component 129 can obtain an installation package from a location, such as a public or private application repository, specified by the configuration profile 139.

After the vulnerability detection component 133 is installed, the management component 129 can request the vulnerability detection component 133 to perform a vulnerability scan of the client device 106, as shown at step 216. In some examples, the request can include an API call that the vulnerability detection component 133 recognizes as a request to perform a scan. The operating system of the client device 106 can provide an inter-process communication (IPC) service to facilitate communication between components in the client device 106.

At step 219, which is shown in FIG. 2B, the vulnerability detection component 133 can perform the requested vulnerability scan. For example, the vulnerability detection component 133 can perform detection analysis to search for the presence of malicious software, the presence of software or hardware components known to be susceptible to malicious exploit, and the presence of a component that lacks a software patch that remedies a flaw with the component.

As shown at step 223, the vulnerability detection component 133 can then generate data for the results of the vulnerability scan. For example, the data can represent whether the vulnerability detection component 133 detected any vulnerabilities, a description of any detected vulnerabilities, a vulnerability severity metric for any detected vulnerabilities, and information describing characteristics of the client device 106.

At step 226, the vulnerability detection component 133 can transfer the vulnerability scan results to the management component 129. Then, at step 229, the management component 129 can transmit the vulnerability scan results to the management service 116.

As indicated at step 233, the management service 116 can determine an action to perform in response to the vulnerability scan results. In some examples, a compliance rule 126 can specify particular actions that the management service 116 can perform based on the vulnerability severity metric in the vulnerability scan results. For example, if the vulnerability severity metric is below a particular value, the management service 116 can cause the client device 106 to exit a quarantine state. If the vulnerability severity metric is above a particular value, the management service 116 can associate the client device 106 with a permanent flag that indicates that the client device 106 is compromised, as described above. Once the management service 116 determines the action to perform, the management service 116 can perform the action, as shown at step 236.

At step 239, the management service 116 can transmit the vulnerability scan results to the vulnerability detection service 143. As described above, the vulnerability detection service 143 can perform further vulnerability detection analysis on the vulnerability scan results. In addition, the vulnerability detection service 143 can receive scan results from several enterprise computing environments 103 and perform statistical analysis on the data. Thereafter, the process can end.

Figure 3:
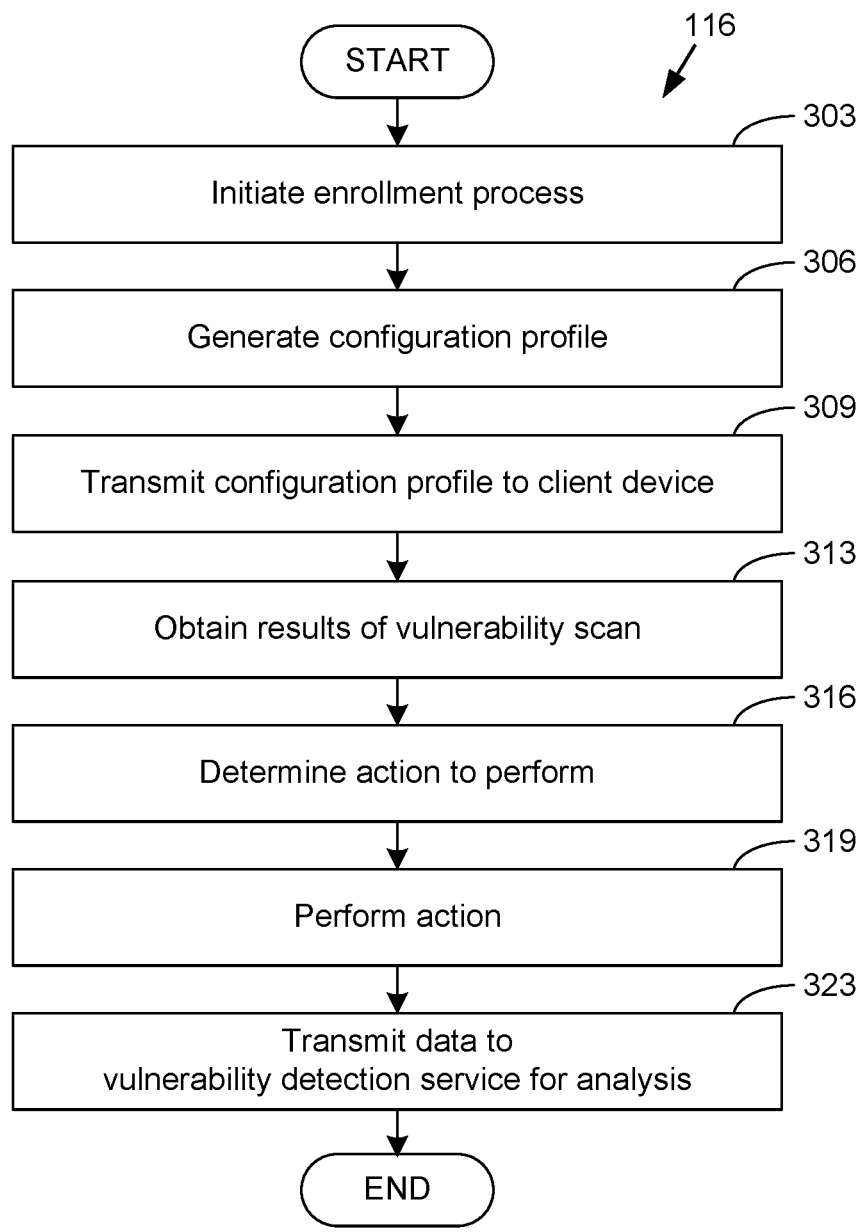
FIG. 3 shows a flowchart illustrating an example of functionality implemented by a management service.

With reference to FIG. 3, shown is a flowchart that provides an example of a portion of the operation of the management service 116. In particular, FIG. 3 provides an example of the management service 116 providing a configuration profile 139 to the management component 129 and performing an action in response to receiving vulnerability scan results. The flowchart of FIG. 3 can be viewed as depicting an example of a method implemented in the client device 106.

Beginning with step 303, the management service 116 can initiate the process of enrolling the client device 106 with the management service 116. As previously discussed, the enterprise that operates the enterprise computing environment 103 can require individuals its employees and contractors to enroll their client devices 106 with the management service 116 to reduce the risk of being subject to malicious computer activity and unauthorized access to enterprise resources.

As shown at step 306, the management service 116 can generate a configuration profile 139 for the client device 106. The configuration profile 139 can specify settings and restrictions in the client device 106. The configuration profile 139 can also specify that the management component 129 is to install the vulnerability detection component 133 and request the vulnerability detection component 133 to perform a vulnerability scan of the client device 106. In addition, the configuration profile 139 can include the public key for the developer of the vulnerability detection component 133 that the management component 129 can use to authenticate communications from the vulnerability detection component 133. As shown at step 309, the management service 116 can transmit the generated configuration profile 139 to the management component 129.

The management service 116 can then move to step 313 and obtain the results of a vulnerability scan performed by the vulnerability detection component 133. As described above, the management component, vulnerability detection component 133, or vulnerability detection service 143 can provide the vulnerability scan results to the management service 116. The vulnerability scan results can include a vulnerability severity metric that represents a level of severity of vulnerabilities detected in the client device 106.

At step 316, the management service 116 can determine an action to perform in response to the vulnerability scan results. In some examples, the compliance rules 126 can specify actions to perform responsive to the scan results. For instance, a compliance rule 126 can specify that the management service 116 to provide the client device 106 with a replacement configuration profile 139 with stricter restrictions if the scan results include a relatively high vulnerability severity metric. As an example, the replacement configuration profile 139 can prevent access to enterprise resources that would otherwise be available to the client device 106 if a vulnerability was not detected. The stricter restrictions implemented through the configuration profile 139 can be specified by an administrator in some examples. Another compliance rule 126 can specify that the management component 129 is to cause the client device 106 to exit a quarantine state if the scan results include a relatively low vulnerability severity metric. Another compliance rule 126 can deny enrollment of the client device 106 is a vulnerability is detected. The management service 116 can perform the action at step 319.

As indicated at step 323, the management service 116 can transmit data, such as the scan results, to the vulnerability detection service 143. By sharing data, such as the scan results, with the vulnerability detection service 143, the vulnerability detection service 143 can improve detection algorithms used by the vulnerability detection component 133. Thereafter, the process can end.

Figure 4A:
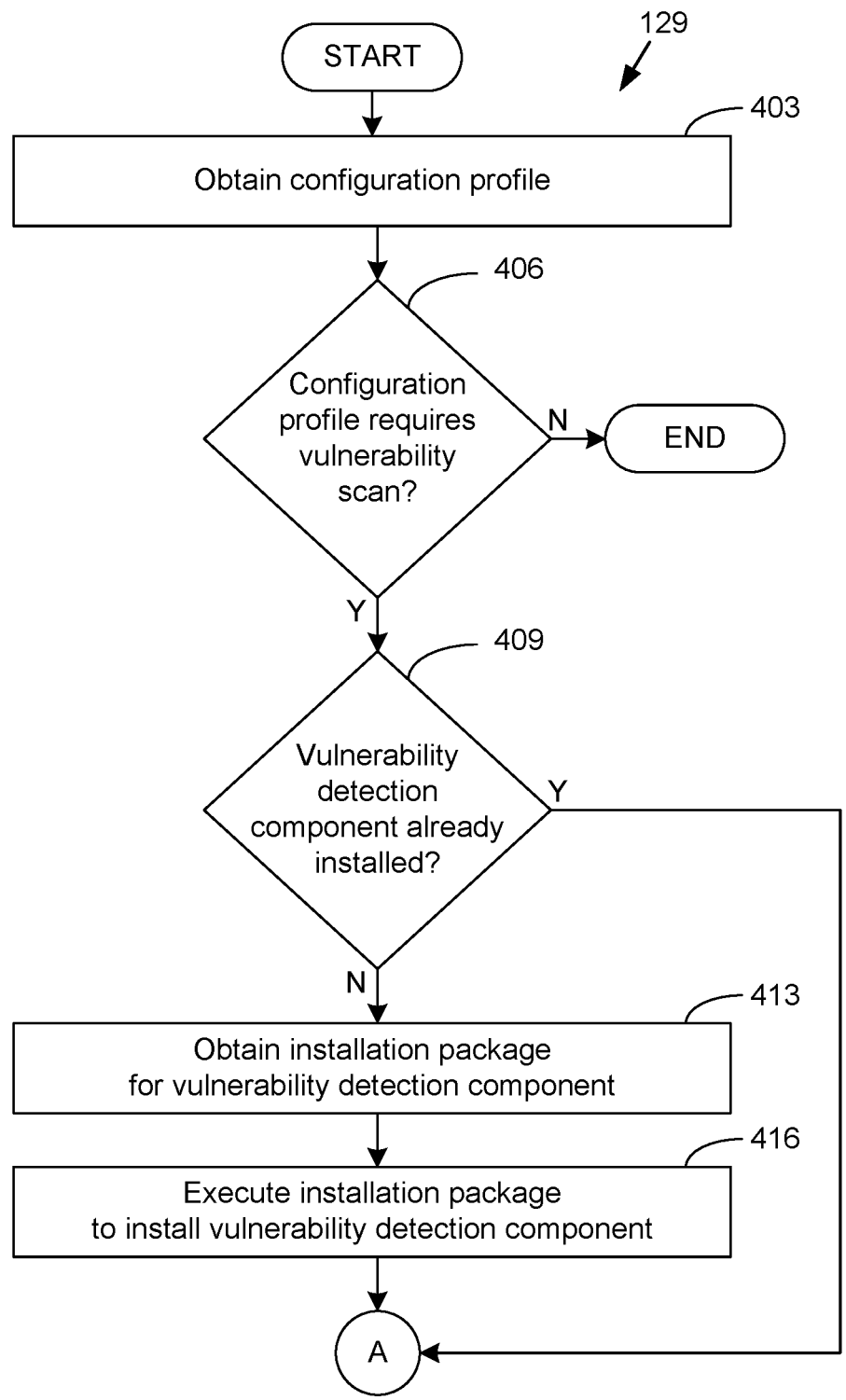
FIGS. 4A-4B show a flowchart illustrating an example of functionality implemented by a management component.
Figure 4B:
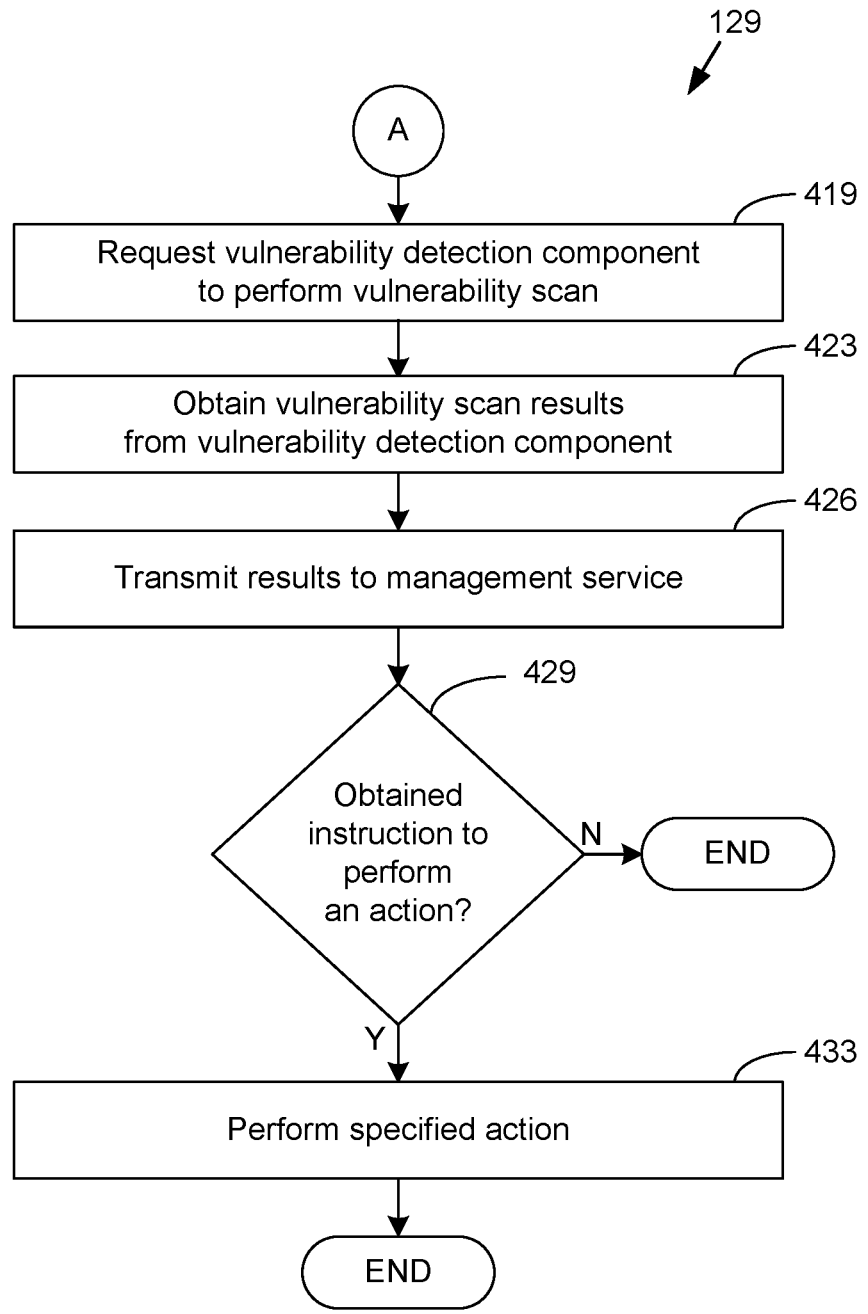

With reference to FIGS. 4A-4B, shown is a flowchart that provides an example of a portion of the operation of the management component 129. In particular, FIGS. 4A-4B provide an example of the management component 129 requesting the vulnerability detection component 133 to perform a vulnerability scan and then performing an action in response to results of the scan. The flowchart of FIGS. 4A-4B can be viewed as depicting an example of a method implemented in the client device 106.

Beginning with step 403, the management component 129 can obtain a configuration profile 139. The configuration profile 139 can specify settings and restrictions in the client device 106. The configuration profile 139 can also specify that the management component 129 is to install the vulnerability detection component 133 and request the vulnerability detection component 133 to perform a vulnerability scan of the client device 106.

As shown at step 406, the management component 129 can determine whether the configuration profile 139 requires a vulnerability scan of the client device 106. The management component 129 can parse the configuration profile to determine whether a vulnerability scan is required. If a vulnerability scan is not required, the process can end as shown.

Otherwise, if a vulnerability scan is required, the management component 129 can move to step 409 and determine whether the vulnerability detection component 133 is already installed in the client device 106. To this end, the management component 129 can obtain and parse a list of installed applications to determine whether the vulnerability detection component 133 is represented in the list.

If the vulnerability detection component 133 is not already installed, the management component 129 can obtain an installation package for the vulnerability detection component 133, as shown at step 413. In some examples, the configuration profile 139 can specify a location where the installation package is available, and the management component 129 can download the installation package from the specified location. After the management component 129 has obtained the installation package, the management component 129 can execute the installation package to thereby install the vulnerability detection component 133, as shown at step 416.

The management component 129 can then proceed to step 419, which is shown in FIG. 4B. The management component 129 can also arrive at step 419 if, at step 409, the management component 129 determines that the vulnerability detection component 133 is already installed in the client device 106.

As shown at step 419, the management component 129 can request the vulnerability detection component 133 to perform a vulnerability scan. To this end, the management component 129 can make an API call to the vulnerability detection component 133 that the vulnerability detection component 133 can recognize as an instruction to initiate a scan.

At step 423, the management component 129 can obtain results of the vulnerability scan from the vulnerability detection component 133. As described above, the management component 129 can provide an API that facilitates the vulnerability detection component 133 communicating with the management component 129 and providing the scan results. The scan results can indicate whether the vulnerability detection component 133 detected a vulnerability. In addition, the scan results can include a vulnerability severity metric that can indicate a level of severity of any detected vulnerabilities. At step 426, the management component 129 can transmit the scan results to the management service 116.

As shown at step 429, the management component 129 can determine whether it obtained an instruction to perform an action. For example, the management service 116 can provide the management component 129 an instruction to perform an action in response to the scan results that the management component 129 transmitted at step 426. Examples of actions to perform include installing a replacement configuration profile 139, disabling a network interface, disabling email access, and removing access to enterprise data in the client device 106.

In alternative embodiments, the management component 129 can process the scan results to determine whether the management component 129 should perform an action. For example, a compliance rule 126 can specify that if the management component 129 detects that scan results include a vulnerability severity metric exceeding a particular value, the management component 129 should perform a particular action, such as uninstalling an application in the client device 106.

If, at step 429, the management component 129 does not obtain an instruction to perform an action, the process can end as shown. Otherwise, if the management component 129 did obtain an instruction to perform an action, the management component 129 can perform the specified action, as shown at step 433. Thereafter, the process can end.

Figure 5:
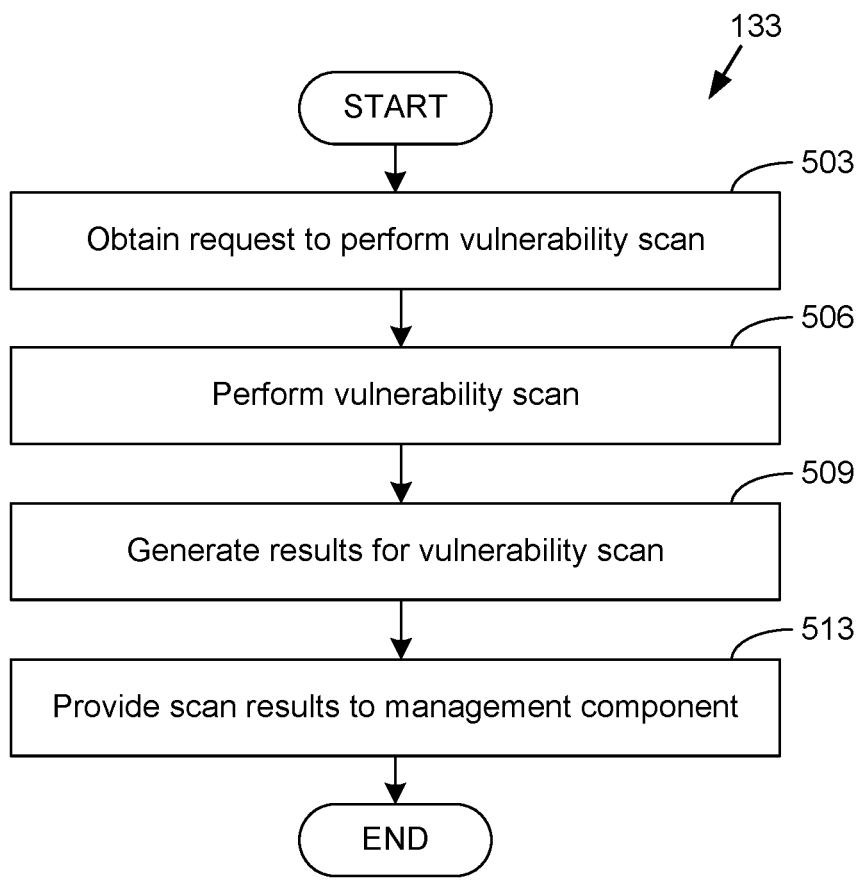
FIG. 5 shows a flowchart illustrating an example of functionality implemented by a vulnerability detection component.

With reference to FIG. 5, shown is a flowchart that provides an example of a portion of the operation of the vulnerability detection component 133. In particular, FIG. 5 provides an example of the vulnerability detection component 133 obtaining a request to perform a vulnerability scan and then providing results of the vulnerability scan to the management component 129. The flowchart of FIG. 5 can be viewed as depicting an example of a method implemented in the client device 106.

Beginning with step 503, the vulnerability detection component 133 can obtain a request to perform a vulnerability scan. As described above, the management component 129 can provide the request to perform the scan.

At step 506, the vulnerability detection component 133 can perform the requested vulnerability scan. For example, the vulnerability detection component 133 can execute vulnerability detection algorithms to search for the presence of malicious software, the presence of software or hardware components known to be susceptible to malicious exploit, and the presence of components that lack available software patches.

The vulnerability detection component 133 can then move to step 509 and generate results for the vulnerability scan. For example, the vulnerability detection component 133 can generate information that describes the results of the scan, such as the identity of any detected vulnerabilities and a vulnerability severity metric. The vulnerability severity metric can be a score that indicates to the management component 129 and management service 116 a level of severity of any detected vulnerabilities in the client device 106.

As shown at step 513, the vulnerability detection component 133 can provide the results of the vulnerability scan to the management component 129. To this end, the vulnerability detection component 133 can send a message to the management component 129 using an IPC service provided by the operating system of the client device 106. Thereafter, the process can end.

The sequence diagrams and flowcharts discussed above show examples of the functionality and operation of implementations of components described herein. The components of the networked environment 100 described herein can be embodied in hardware, software, or a combination of hardware and software. If embodied in software, each step in the sequence diagrams and flowcharts can represent a module or a portion of code that includes computer instructions to implement the specified logical functions. The computer instructions can include source code that comprises human-readable statements written in a programming language or machine code that comprises machine instructions recognizable by a suitable execution system, such as a processor in a computer system. If embodied in hardware, each step can represent a circuit or a number of interconnected circuits that implement the specified logical functions.

Although the sequence diagrams and flowcharts discussed above show a specific order of execution, the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid.

The enterprise computing environment 103, client device 106, and vulnerability detection computing environment 109 can each include at least one processing circuit. Such a processing circuit can include one or more processors and one or more storage devices that are coupled to a local interface. The local interface can include a data bus with an accompanying address/control bus.

A storage device for a processing circuit can store data and components that are executable by the one or more processors of the processing circuit. In some examples, at least portions of the management service 116, management component 129, vulnerability detection component 133, and vulnerability detection service 143 can be stored in one or more storage devices and be executable by one or more processors. Also, the enterprise data store 119 and client device data store 136 can each be located in the one or more storage devices.

Components described herein can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or computer instructions can be embodied in any non-transitory computer-readable medium for use by or in connection with an instruction execution system such as, for example, a processor in a computer system or other system. Such a computer-readable medium can contain, store, and maintain the software and computer instructions for use by or in connection with the instruction execution system.

A computer-readable medium can comprise a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

Therefore, the following is claimed:

1. A method of analyzing a computing device prior to enrolling the computing device with a remote management service, comprising:

initiating an enrollment of the computing device with the remote management service;

determining that the remote management service requires a vulnerability scan of hardware and software of the computing device to be performed prior to enrolling the computing device with the remote management service;

installing a vulnerability detection component in the computing device in response to determining that the vulnerability scan is required, the vulnerability detection component being installed by obtaining an installation package for the vulnerability detection component from a location specified by the remote management service;

authenticating the vulnerability detection component using a key associated with a developer of the vulnerability detection component;

requesting the vulnerability detection component to perform a vulnerability scan of the computing device;

in response to authenticating the vulnerability detection component, transmitting a result of the vulnerability scan to the remote management service; and associating the computing device with a quarantine state within the remote management service when the result of the vulnerability scan indicates that a vulnerability is present in the computing device, wherein the quarantine state restricts the computing device to access to a subset of services provided by the remote management service.

2. The method of claim 1, further comprising authenticating the vulnerability detection component using a public key assigned to the developer of the vulnerability detection component.

3. The method of claim 1, further comprising:

performing the vulnerability scan of the computing device at a time when the computing device is associated with the quarantine state; and disassociating the computing device with the quarantine state in response to the result of the vulnerability scan indicating that the vulnerability is not present in the computing device.

4. The method of claim 1, further comprising:

obtaining a configuration profile for the computing device from the remote management service; and determining that the configuration profile specifies that the vulnerability scan of the computing device is required to be performed.

5. The method of claim 1, further comprising:

obtaining a configuration profile for the computing device from the remote management service; and obtaining an installation package for the vulnerability detection component from a location specified by the configuration profile.

6. The method of claim 1, wherein the vulnerability detection component comprises an application configured to detect an operating system vulnerability.

7. A system for analyzing a computing device prior to enrolling the computing device with a remote management service, comprising:

the computing device;
a storage device storing a plurality of computer instructions executable by the computing device, wherein the plurality of computer instructions cause the computing device to at least:
initiate an enrollment of the computing device with the remote management service;
determine that the remote management service requires a vulnerability scan of hardware and software of the computing device to be performed prior to enrolling the computing device with the remote management service;
install a vulnerability detection component in the computing device in response to determining that the vulnerability scan is required, the vulnerability detection component being installed by obtaining an installation package for the vulnerability detection component from a location specified by the remote management service;
authenticate the vulnerability detection component using a key associated with a developer of the vulnerability detection component;
request the vulnerability detection component to perform a vulnerability scan of the computing device;
transmit a result of the vulnerability scan to the remote management service in response to authenticating the vulnerability detection component; and
associate the computing device with a quarantine state within the remote management service when the result of the vulnerability scan indicates that a vulnerability is present in the computing device, wherein the quarantine state restricts the computing device to access to a subset of services provided by the remote management service.

8. The system of claim 7 wherein the plurality of computer instructions further cause the computing device to at least authenticate the vulnerability detection component using a public key assigned to the developer of the vulnerability detection component.

9. The system of claim 7, wherein the plurality of computer instructions further cause the computing device to at least:
perform the vulnerability scan of the computing device at a time when the computing device is associated with the quarantine state; and
disassociate the computing device with the quarantine state in response to the result of the vulnerability scan indicating that the vulnerability is not present in the computing device.

10. The system of claim 7, wherein the plurality of computer instructions further cause the computing device to at least:
obtain a configuration profile for the computing device from the remote management service; and
determine that the configuration profile specifies that the vulnerability scan of the computing device is required to be performed.

11. The system of claim 7, wherein the plurality of computer instructions further cause the computing device to at least:
obtain a configuration profile for the computing device from the remote management service; and
obtaining an installation package for the vulnerability detection component from a location specified by the configuration profile.

12. The system of claim 7, wherein the vulnerability detection component comprises at least one of an antivirus application or an application configured to detect an operating system vulnerability.

13. A non-transitory computer-readable medium for analyzing a computing device prior to enrolling the computing device with a remote management service, the non-transitory computer-readable medium storing a plurality of computer instructions executable by the computing device, wherein the plurality of computer instructions cause the computing device to at least:
initiate an enrollment of the computing device with the remote management service;
determine that the remote management service requires a vulnerability scan of hardware and software of the computing device to be performed prior to enrolling the computing device with the remote management service;
install a vulnerability detection component in the computing device in response to determining that the vulnerability scan is required, the vulnerability detection component being installed by obtaining an installation package for the vulnerability detection component from a location specified by the remote management service;
authenticate the vulnerability detection component using a key associated with a developer of the vulnerability detection component;
request the vulnerability detection component to perform a vulnerability scan of the computing device;
transmit a result of the vulnerability scan to the remote management service in response to authenticating the vulnerability detection component; and
associate the computing device with a quarantine state within the remote management service when the result of the vulnerability scan indicates that a vulnerability is present in the computing device, wherein the quarantine state restricts the computing device to access to a subset of services provided by the remote management service.

14. The non-transitory computer-readable medium of claim 13, wherein the plurality of computer instructions further cause the computing device to at least authenticate the vulnerability detection component using a public key assigned to the developer of the vulnerability detection component.

15. The non-transitory computer-readable medium of claim 13, wherein the plurality of computer instructions further cause the computing device to at least:
perform the vulnerability scan of the computing device at a time when the computing device is associated with the quarantine state; and
disassociate the computing device with the quarantine state in response to the result of the vulnerability scan indicating that the vulnerability is not present in the computing device.

16. The non-transitory computer-readable medium of claim 13, wherein the plurality of computer instructions further cause the computing device to at least:
obtain a configuration profile for the computing device from the remote management service; and
determine that the configuration profile specifies that the vulnerability scan of the computing device is required to be performed.

17. The non-transitory computer-readable medium of claim 13, wherein the plurality of computer instructions further cause the computing device to at least:

obtain a configuration profile for the computing device from the remote management service; and obtaining an installation package for the vulnerability detection component from a location specified by the configuration profile.

18. The non-transitory computer-readable medium of claim 13, wherein the vulnerability detection component comprises at least one of an antivirus application or an application configured to detect an operating system vulnerability.

\* \* \* \* \*